Feb. 12, 1963 L. GUNTER, JR., ET AL 3,077,522
STEREOPHONIC PICKUP CARTRIDGE
Filed Feb. 27, 1959 6 Sheets-Sheet 1
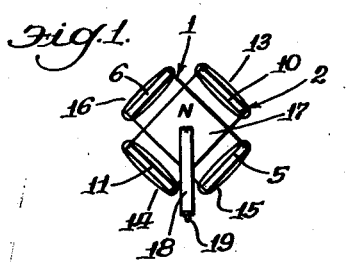
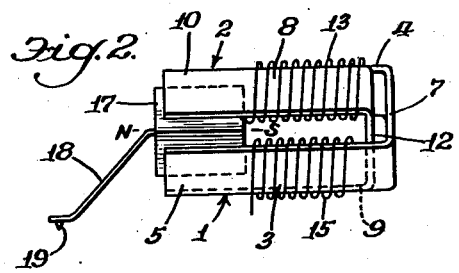
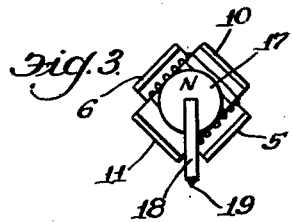
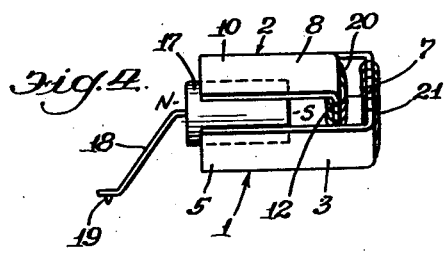
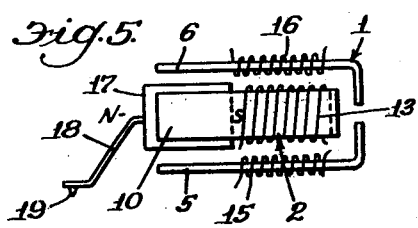
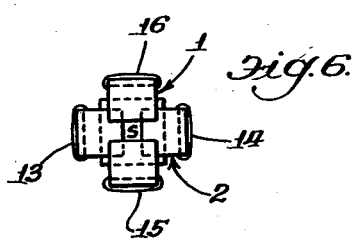
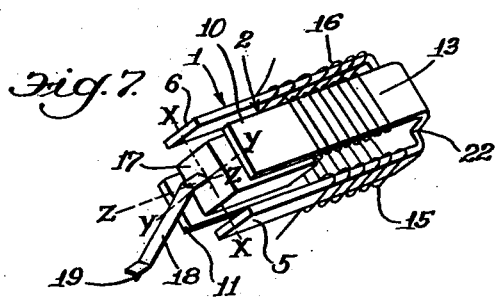
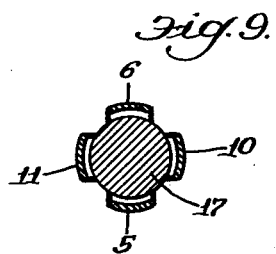
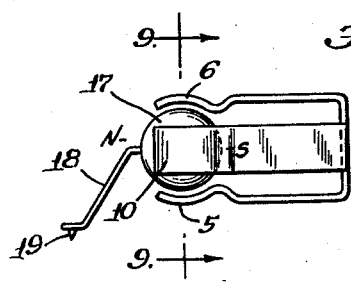
INVENTORS
Lee Gunter, Jr. and
Carl Roger Anderson
By Jones, Danto & Robertson Attys.

Feb. 12, 1963 L. GUNTER, JR., ET AL 3,077,522
STEREOPHONIC PICKUP CARTRIDGE
Filed Feb. 27, 1959 6 Sheets-Sheet 2
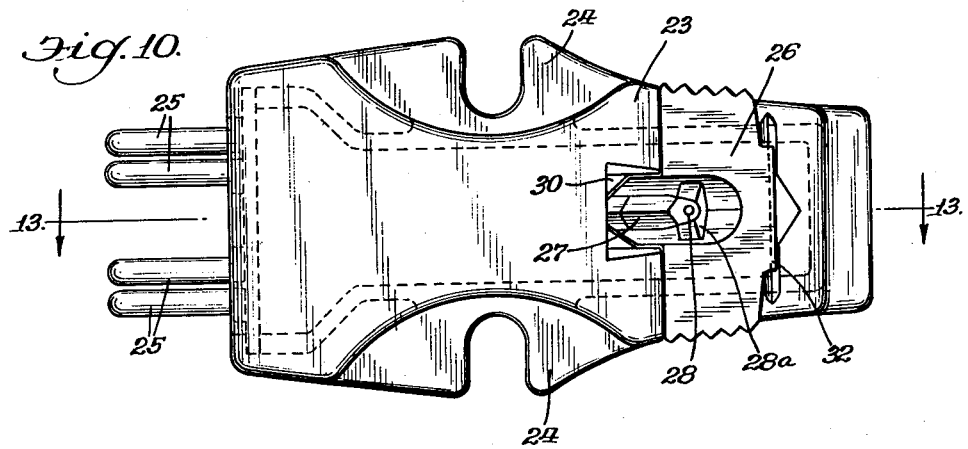
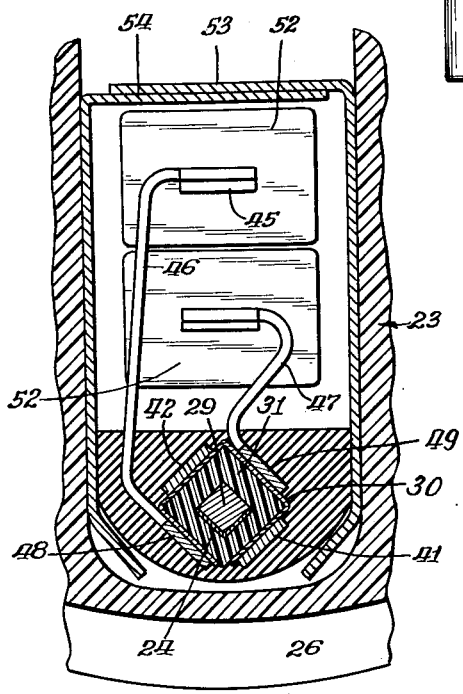
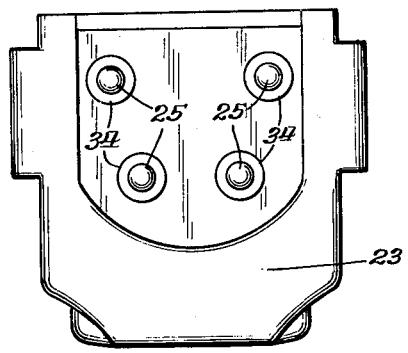
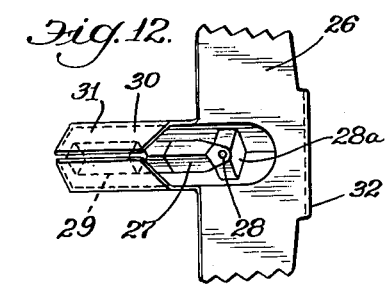
INVENTORS
Lee Gunter, Jr. and
Carl Roger Anderson
By
Jones, Darby + Robertson Attys.

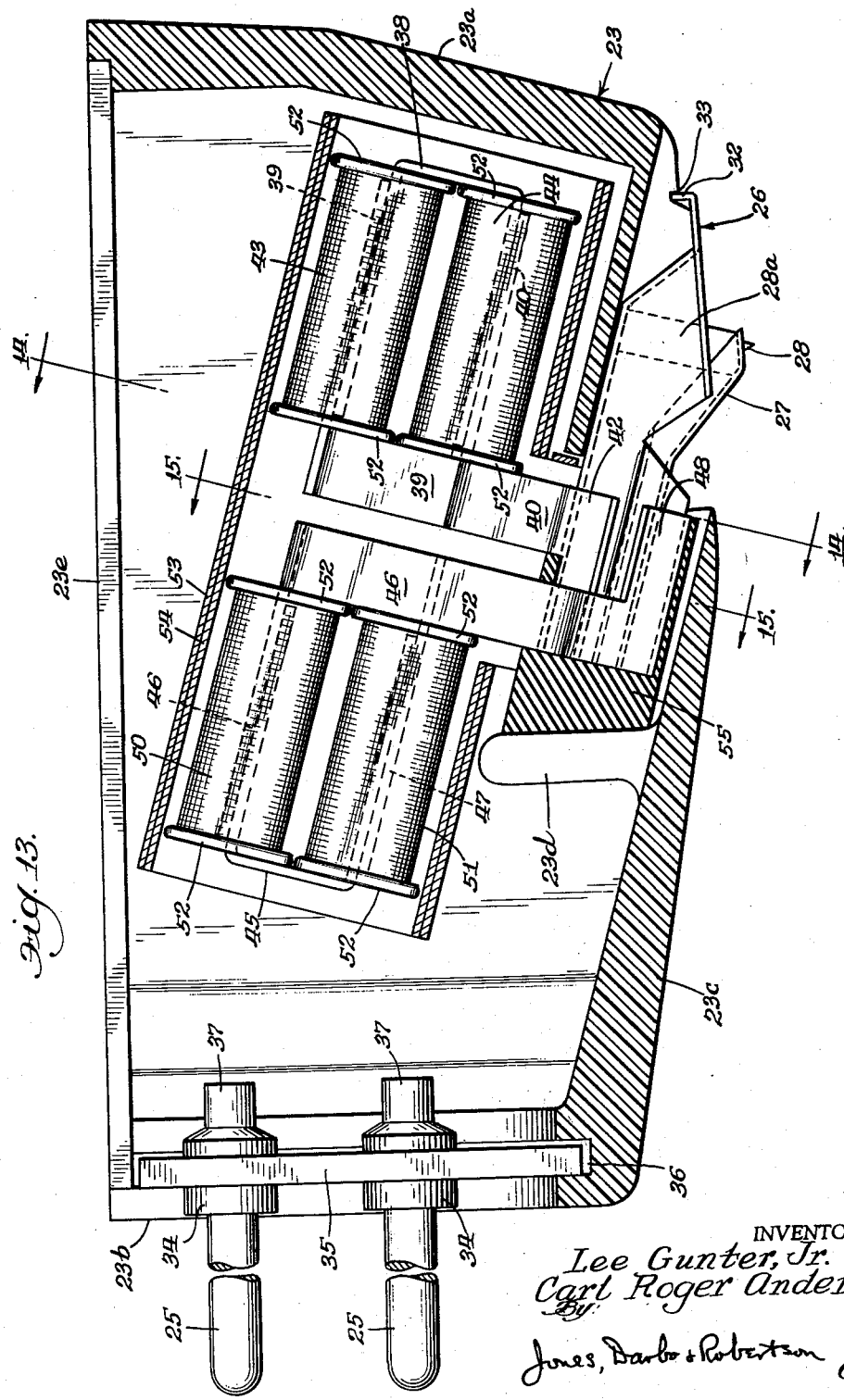

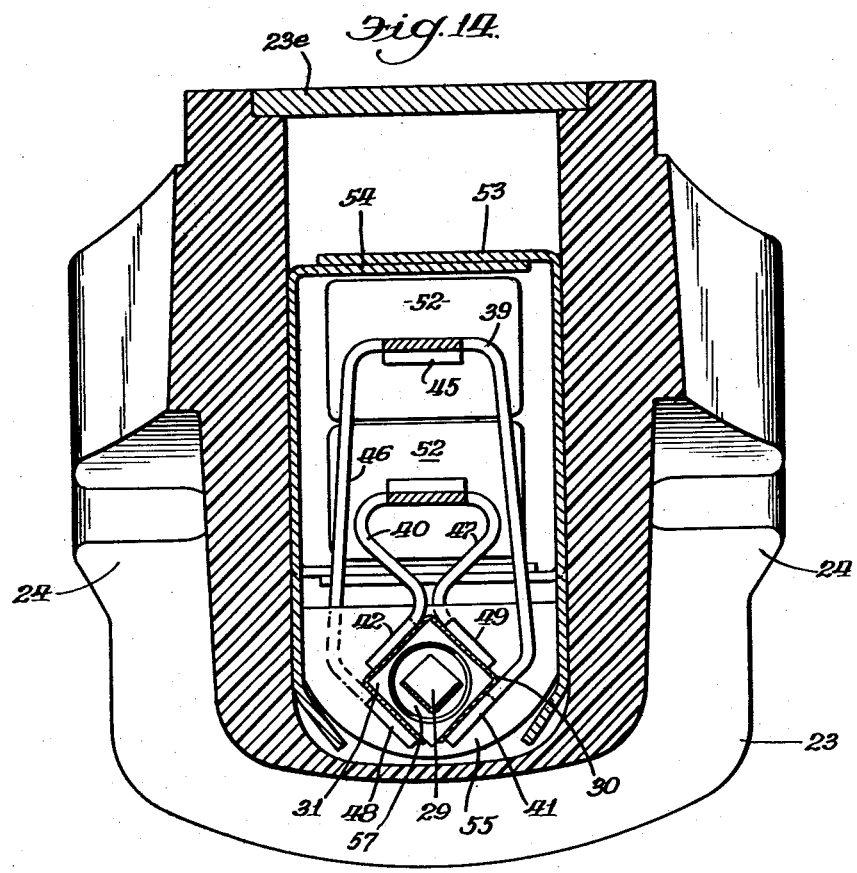

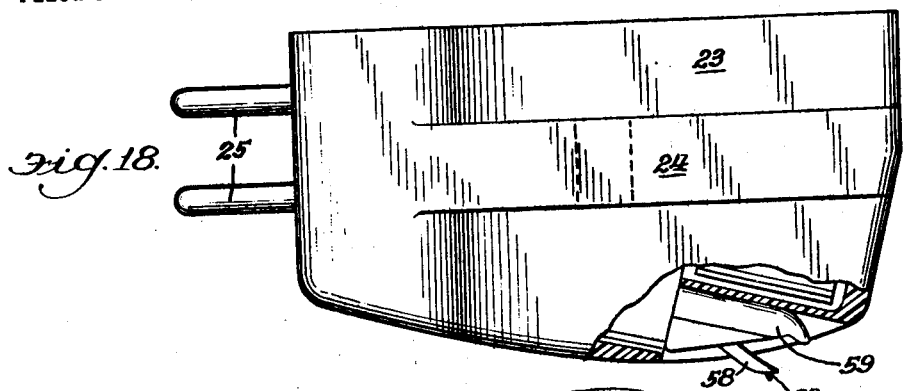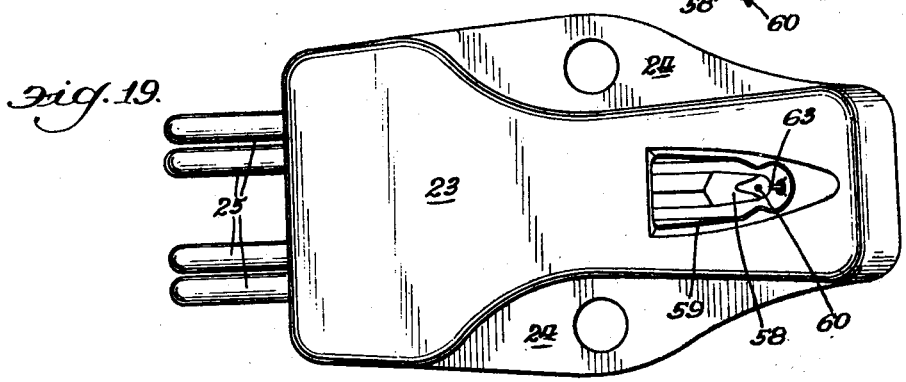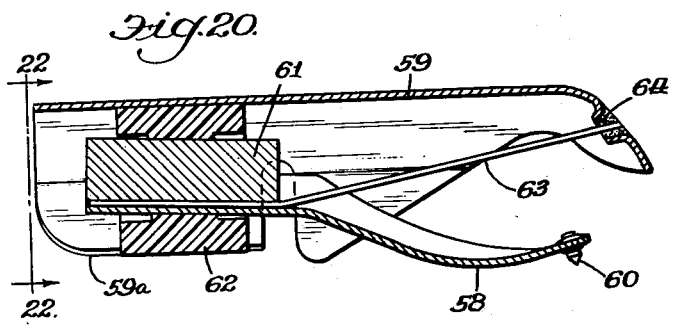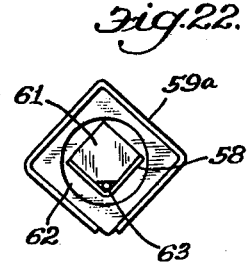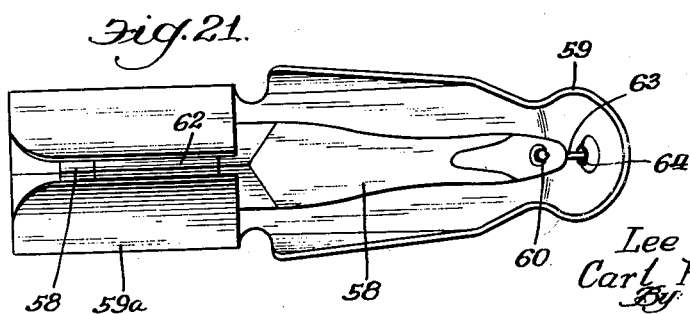

Feb. 12, 1963 L. GUNTER, JR., ET AL 3,077,522
STEREOPHONIC PICKUP CARTRIDGE
Filed Feb. 27, 1959 6 Sheets-Sheet 6

INVENTORS
*Lee Gunter Jr.* and
*Carl Roger Anderson*
By *Jones, Darbo & Robertson*
Att'ys.

3,077,522
United States Patent Office
Patented Feb. 12, 1963

3,077,522
STEREOPHONIC PICKUP CARTRIDGE
Lee Gunter, Jr., Mount Prospect, and Carl Roger Anderson, Park Ridge, Ill., assignors to Shure Brothers Incorporated, Evanston, Ill., a corporation of Illinois
Filed Feb. 27, 1959, Ser. No. 795,976
6 Claims. (Cl. 179—100.41)

This invention relates to apparatus for the transformation of mechanical vibrations into electrical impulses, and more particularly refers to a magnetic phonograph pickup cartridge for stereophonic reproduction of sound from stereophonically recorded disks.

One of the reasons for the failure to achieve realism in sound reproduced from electrically transcribed media has been the fact that the sound reaches the listener from substantially a single direction. In recent years, two and three channel stereophonic recordings on magnetic tape have been highly successful in introducing realism into recorded sound. In spite of their excellent technical results, however, stereophonic tape recordings have not achieved complete commercial success because of their high cost. One reason for the high cost has been the failure to date to discover a satisfactory method for the mass production of pre-recorded magnetic tape. A second factor has been that when two channels are simultaneously recorded on a tape, the playing time is cut in half.

Until recently, stereophonic disk recordings have been substantially limited to the use of dual grooves with two spaced-apart pickup heads coupled together, each one tracking a separate groove. With this medium, although the problem of mass production was solved, difficulty was encountered in maintaining the two pickups properly spaced apart. Additionally, only half as much playing time could be recorded on each disk in view of the fact that two grooves were used simultaneously.

Recently, stereophonic disks have been developed wherein two separate channels are recorded in a single groove. This may be done in one of at least two ways. In one method, one channel is recorded laterally and the other vertically. In another method, a channel is recorded on each of the two sides of the groove at an angle of 45° with respect to the disk surface, each channel being cut at an angle of 90° with respect to the other channel. This latter method has been generally accepted by the industry as it results in recordings which may be reproduced with excellent fidelity and adequate channel separation.

It is an object of the invention to provide a phonograph pickup cartridge suitable for the simultaneous reproduction of dual channel stereophonic sound from single groove record disks.

It is a further object to provide such a pickup which, by proper orientation, may be used to reproduce multichannel sound from records which are cut either according to the lateral-vertical system or according to the 45°–45° or Westrex system.

It is still further an object to provide a pickup which is capable of reproducing simultaneously two separate signals having exceptionally high fidelity by virtue of the fact that the moving system of the pickup has a low mass and relatively small moment of inertia about the axes of oscillation.

Another object is to provide a dual channel pickup which is adequately shielded from stray magnetic fields.

It is a further object to provide such a pickup having an armature and stylus assembly which may be easily inserted an oriented within the cartridge, which maintains its precise orientation over long periods and which may be easily removed for replacement when the stylus tip becomes worn.

It is a still further object to provide a stereo pickup which is simple in construction and which may be manufactured at relatively low cost.

It is a still further object to provide such a cartridge which has high compliance and which will accurately track a needle groove at a low stylus force.

It is a still further object to provide such a cartridge which has adequate channel separation between the two recorded channels.

Broad subject matter illustrated but not broadly claimed herein is claimed in application of Benjamin B. Bauer, Serial No. 796,039, filed February 27, 1959, Erhard Bauer, Serial No. 772,283, filed November 6, 1958, and Erhard Ahrens Serial No. 768,785, filed October 21, 1958, all assigned to the same assignee.

Other objects and advantages will become apparent from the following description when taken in conjunction with the accompanying drawings, in which:

FIGS. 1–9 are somewhat diagrammatic views as follows:

FIG. 1 is an end view of a stereophonic transducer according to the present invention designed to operate with phonograph disks whose grooves are cut according to the 45°–45° or Westrex system;

FIG. 2 is a side view of the embodiment of FIG. 1;

FIG. 3 is an end view of a transducer similar to that of FIG. 1 except that only a single coil is wound about the yoke of each electromagnet;

FIG. 4 is a side view of the embodiment shown in FIG. 3;

FIG. 5 is a side view of a transducer according to the present invention which is oriented to transcribe sound from stereophonically recorded disks according to the lateral-vertical system;

FIG. 6 is an end view of the embodiment of FIG. 5;

FIG. 7 is a perspective view of a transducer similar to that of FIGS. 1 and 2 except that both magnetic cores have a common yoke;

FIG. 8 is a side view of a transducer according to the present invention wherein the armature is in the shape of a sphere;

FIG. 9 is a cross-sectional view of the transducer shown in FIG. 8 taken at the line 9—9 of FIG. 8;

FIG. 10 is a bottom view of the stereophonic pickup cartridge utilizing the transducer system of the present invention;

FIG. 11 is a rear end view of the cartridge shown in FIG. 10;

FIG. 12 is a bottom view of the stylus-armature subassembly;

FIG. 13 is a cross-sectional view of the pickup cartridge taken at the line 13—13 of FIG. 10;

FIG. 14 is a cross-sectional view of the cartridge taken at the line 14—14 of FIG. 13;

FIG. 15 is a cross-sectional view of the cartridge taken at the line 15—15 of FIG. 13;

FIG. 16 is a side elevation of a core assembly;

FIG. 17 is a cross-sectional view of an elastomeric bearing for the armature;

FIG. 18 is a side view partially broken away showing a cartridge according to the present invention and containing an alternative improved embodiment of the stylus-armature subassembly;

FIG. 19 is a bottom view of the cartridge of FIG. 18 showing the improved subassembly;

FIG. 20 is a side view in cross-section of the stylus-armature subassembly in its improved form;

FIG. 21 is a bottom view of the improved stylus-armature subassembly;

FIG. 22 is an end view of the improved subassembly taken from the line 22—22 of FIG. 20.

Figure 23:
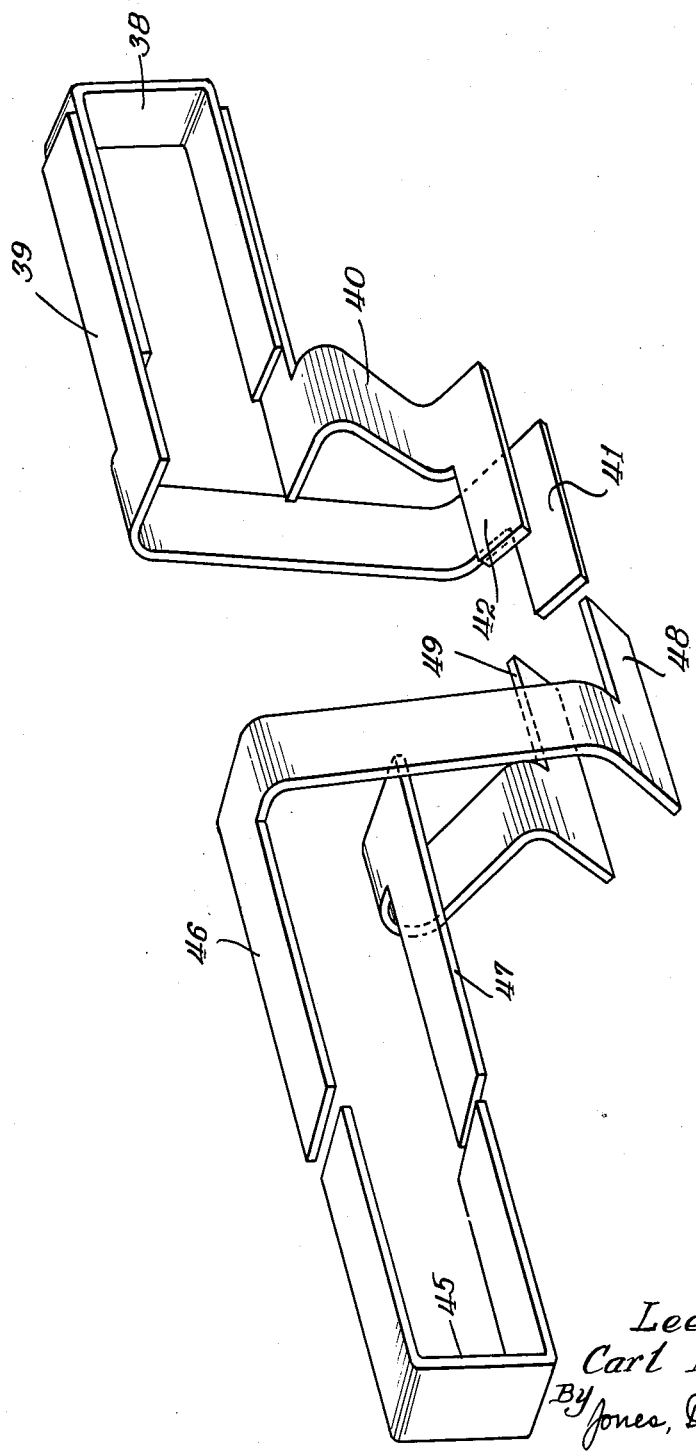
FIG. 23 is a perspective view partially exploded of the core and pole pieces shown in FIGS. 13–16.

The stereophonic transducer system of the present invention will first be discussed with reference to the diagrammatic illustrations of FIGS. 1–9. It will, of course, be understood that the structural details of the cartridge subsequently illustrated may be employed with any of the several forms of transducer systems illustrated in FIGS. 1–9.

In the transducer system shown in FIGS. 1 and 2, a pair of magnetic cores 1 and 2 each having a pair of poles terminating in spaced pole pieces that are coaxially arranged with the directions of the gaps between their respective pole pieces normal to each other. Core 1 comprises lateral poles 3 and 4 terminating in pole pieces 5 and 6, and having a yoke 7 connecting the lateral poles to form a substantially U-shaped core. Core 2 is comprised of lateral poles 8 and 9 terminating in pole pieces 10 and 11 and having a yoke 12. Each lateral pole has a coil of wire mounted thereon, coils 13 and 14 being connected in series about core 2, and coils 15 and 16 being connected in series about core 1. Each pair of coils is so connected that the induced voltages are additive. A magnetic armature 17 is positioned in the common gap formed by the four pole pieces, as will be described in greater detail in connection with the description of the complete pickup cartridge structure. The armature 17 in this instance having a square cross section, is supported in the proper position within the gap with its north and south poles oriented as shown by means of a bearing, not shown in FIGS. 1 and 2, of an elastomeric material such as natural or artificial rubber, vinyl chloride, etc., which will permit oscillatory movement of the magnet in any direction, and which will restore the armature to its neutral position. The stylus assembly comprised of a stylus shank 18 and a stylus tip 19 is affixed to the armature 17. The stylus shank should preferably be substantially rigid to insure accurate transmission of vibration in all directions from the stylus tip to the armature.

FIGS. 3 and 4 show another embodiment of the transducer system of FIGS. 1 and 2. Here the armature 17 has a cylindrical form. Additionally, each core has a single coil 20 and 21 respectively, mounted at the yoke thereof.

A somewhat altered version is illustrated in FIGS. 5 and 6. The orientation of the structure is such that it is suitable for use with a phonograph disk recorded according to the vertical-lateral system. As an additional feature, each of the cores 1 and 2 has a secondary gap at its yoke. This feature is designed to minimize noise or hum that may be induced by stray magnetic fields. The armature has a square cross section similar to that of FIGS. 1 and 2, but is oriented so that in use its respective side surfaces will be either parallel or perpendicular to the disk surface.

Shown in perspective in FIG. 7 is a transducer system similar in structure and operation to that shown in FIGS. 1 and 2, but one in which the cores 1 and 2 have a common yoke 22. Additionally, guide lines have been provided in this view as an aid in defining and understanding the orientation of the armature 17 and pole pieces 5, 6, 10 and 11, and of the terms used in connection therewith. In the diagram, the line $x$—$x$ represents the gap direction line of core 1. The line $y$—$y$ represents the gap direction line of the core 2, and the line $z$—$z$ represents the magnetic axis of the armature 17. The terms "gap direction line" and "gap direction" as used in the specification and claims hereof represent the direction of an imaginary straight line which is perpendicular to a plane between a pair of opposed pole pieces and which plane is so located that movement of the magnet in or parallel to that plane will produce substantially no magnetic change or response in the electromagnet or yoke or core associated with those opposed pole pieces. The term "magnetic axis" as herein used and shown by the line $z$—$z$ refers to an imaginary line connecting and passing through the north and south poles of the armature magnet. In order to provide reproduction free from distortion, the armature 17 is oriented symmetrically in the common gap formed by the pole pieces, and in such a manner that the magnetic axis $z$—$z$ is perpendicular to both the gap direction line $x$—$x$ and the gap direction line $y$—$y$. The pole pieces should also be arranged so that the lines $x$—$x$ and $y$—$y$ are perpendicularly disposed to each other. In the embodiment shown in FIG. 7, where both cores are similarly directed, the two lines intersect each other and are substantially perpendicular, defining a plane which is perpendicular to line $z$—$z$. In the embodiment shown in FIGS. 10–17, as will be seen, the cores are oppositely positioned, and the gap direction lines $x$—$x$ and $y$—$y$, although perpendicularly disposed, may not intersect each other. However, as herein used in the specification and claims the term "perpendicular to" in reference to the relative position of the flux gap lines to each other is to be taken as including both cases, one where the lines are perpendicular and intersect each other, and the other where the lines, although not coplanar, are perpendicularly disposed. In relation to the magnetic axis $z$—$z$, however, both gap direction lines, $x$—$x$ and $y$—$y$ should be both perpendicular and intersecting. In order to insure high fidelity reproduction, the afore-described orientation of the various parts must be followed regardless of the shape of the armature or the contour or position of the pole pieces.

A transducer incorporating a spherical magnet armature is shown in FIGS. 8 and 9. The magnetic axis of the armature is oriented in the same direction as that of the armature shown in FIGS. 1 and 2. In order that the spacing between the pole pieces 5, 6, 10 and 11 and the armature may be made as small as possible to maximize the electrical output of the transducer, the pole pieces may be contoured to conform to the curvation of the spherical armature, as shown in FIG. 9.

The magnet armature is so positioned and constrained within the common gap by the elastomeric bearing that the magnet is free to undergo angular vibration substantially about a point. The point should preferably be intermediate the magnetic poles of the magnet, and best results are obtained when the point is equidistant from the two magnetic poles. As a result of this constraint, the magnetic axis of the magnet will undergo angular vibration about this point in such a manner that the magnetic poles simultaneously move in opposite directions transverse to the magnetic axis. The functional result is that the north pole, for example, may approach one pole piece of one electromagnet system while the south pole approaches the opposite pole piece of the same electromagnet system when a force is applied to the stylus tip.

As used herein, "angular vibration substantially about a point" is intended to refer to movement of the magnet and magnetic axis about the designated point in such a manner that, with the designated point being intermediate the poles of the magnet, the instantaneous transverse movement of the magnet on one side of the point is opposite in direction to the instantaneous transverse movement of the magnet on the other side of the point, the magnet being substantially stationary at the point. The term "angular vibration substantially about a point" is not intended to include rotary oscillation about the magnetic axis or translation of the point, since this type of motion is not instrumental in inducing voltage in the magnetic coils of the system.

In operation, the coils of the transducer in any of the forms shown in FIGS. 1–9 are connected to suitable preamplifiers, amplifiers and speaker systems. The embodiments shown in FIGS. 1–4 and 7 are designed for use with dual channel stereo-recorded disks of the 45°–45° type. Each channel is cut at an angle of 45° from the horizontal plane of the disk surface, and at an angle of 90° with respect to the other channel. Thus, when the stylus tip 19 is placed in a disk groove, one channel causes the stylus tip to move in a direction parallel to the line x—x shown in FIG. 7, with the result that the armature 17 vibrates about an axis passing through the armature and disposed perpendicularly to the line x—x. As a result, the magnetic flux of the armature induces currents in the coils 15 and 16. However, since the movement is parallel to the pole pieces 10 and 11, substantially no current will be induced in coils 13 and 14 by reason of vibration of the armature in this plane. The other channel recorded on the opposite side of the groove causes the stylus tip 19 to move in a direction parallel to the line y—y. This causes the armature to vibrate and to induce a current in the coils 13 and 14 but substantially no curent in the coils 15 and 16. In actual operation, the stylus is simultaneously influenced by both channels and the resulting movement of the armature is extremely complex. Nevertheless, by reason of the arrangement of elements and channels, each separate set of coils will be influenced only by that one component of the two motion patterns which is in the direction of the line of the direction of the gap between its pole pieces and two separate signals emerge from the coils.

The transducer systems shown in FIGS. 5, 6, 8 and 9 are similar to those of the previous figures except that they are oriented for use with disks recorded in the vertical-lateral system. The transducer system is oriented at an angle of 45° from the previously described system. Here, too, the current induced in each electromagnet is proportional to the component of the overall motion parallel to the line of its gap direction.

FIGS. 10–15 illustrate by way of example a suitable form of cartridge structure embodying a transducer system according to the present invention. FIG. 10 illustrates a bottom view of the cartridge and stylus assembly. The transducer assembly is contained in a molded plastic case 23. Mounting flanges 24 are provided on the case for affixing the cartridge to a tone arm. Four terminal prongs 25 are affixed to the plastic case for connection to the transducer coils. If desired, a common ground may be used, in which case three terminal prongs suffice. Positioned in a socket provided therefor is the stylus-armature assembly comprised of a supporting spade member 26, a stylus shank 27, a stylus tip 28, and a magnetic armature 29, shown more clearly in FIG. 15. The stylus shank is formed with a right angular cross section from a non-magnetic metal such as aluminum. It is necessary that the metal be non-magnetic in order that it will not interfer with the flux field of the armature. One end of the stylus shank 27 is flattened and angled toward its concave direction to provide a mounting means for the stylus tip 28, for support thereof in a direction substantially perpendicular to the surface of the record disk in order to provide accurate tracking of the disk groove. The stylus tip 28 is permanently affixed to the flat mounting portion. An elastomeric block 28a may be positioned between the stylus shank supporting the tip and the spade member 26. This block serves to support the stylus tip, and to provide resonance damping of the stylus assembly. The armature 29 is affixed to the concave surfaces of the inner end of the stylus shank, by any suitable means, such as cementing. The armature magnet may be composed of any suitable ferromagnetic material having good retentivity, such as alnico or a ceramic magnetic material such as a composition comprised of iron oxide and cobalt oxide.

The spade member 26 has an elongated portion or ferrule 30 which is formed substantially in the shape of a tube having a square cross section. The dimensions of the cross section are so chosen that the ferrule inserts snugly in the common gap formed by the four pole pieces. Within the ferrule 30 of the spade member is retained an elastomeric bearing 31 having an axial rectangular socket in which the stylus shank and armature are mounted. The armature and stylus shank assembly is preferably cemented to the bearing. The bearing 31, by means of its rectangular socket, precisely orients the stylus shank 27 and armature 29 with respect to the pole pieces. The entire subassembly comprising the spade 26, the stylus shank 27 and the armature 29 is inserted by grasping the serrated wings of the spade and pushing the entire assembly into the socket. A turned-down lip 32 engages a detent 33, shown in FIG. 13, for securing the subassembly in position. The subassembly may be easily removed by disengaging the detent and retracting the assembly from the socket.

FIG. 11 illustrates the rearward end of the cartridge comprising the cartridge case 23, the terminal prongs 25, and positioning beads 34 provided in the prongs.

In FIG. 12 the stylus armature assembly is shown in detail, the assembly comprising the spade member 26, the spade ferrule 30, the armature 29, the stylus shank 27, and the stylus tip 28. The elastomeric bearing 31 contained within the spade ferrule retains and orients the stylus shank and armature within a socket provided in the bearing, and additionally provides vibrational damping for the assembly.

Referring to FIG. 13, the cartridge and transducer assembly are shown in detailed cross section. The cartridge case 23 is comprised of a forward wall 23a, a rear wall 23b, floor 23c, and a vertical retaining wall 23d. A separate insulating terminal board 35 is inserted and retained in a groove 36 provided in the rear of the housing. The terminal board is comprised of a strong plastic material such as a laminated phenolic resin. The terminal prongs 25 have inserts 37 which are retained in holes provided in the terminal board, and limited by beaded portions 34. The inserts 37 are connected to the electromagnetic coils. A plate 23e is inserted and affixed as by cementing at the top of the cartridge case after the transducer has been mounted, and completing the case enclosure. The plate may also be used as a name plate.

The electromagnetic system of the transducer is comprised of two separate electromagnets mounted, respectively, in forward and rear portions of the cartridge facing each other. Each of the electromagnets is comprised of a tripartite core and a pair of coils. The core of the forward electromagnet is composed of a yoke 38, and two lateral poles 39 and 40, terminating in pole pieces 41 and 42. A pair of coils 43 and 44 are mounted in the lateral poles 39 and 40 and connected in series so that their induced voltages are additive. The rearwardly mounted electromagnet similarly comprises a core having a yoke 45, lateral poles 46 and 47, and pole pieces 48 and 49. The four pole pieces are cast into an epoxy resin block 55 in order to facilitate the cartridge assembly and in order to maintain the precise orientation of the pole pieces permanently. A pair of series-connected coils 50 and 51 are mounted on the lateral poles 46 and 47 and are connected in a manner similar to that of coils 43 and 44. Plastic end plates 52 support the ends of the coils. A magnetic shield comprised of two half-shells 53 and 54 almost completely surrounds the electromagnets and the armature, and shields them from stray magnetic fields. The shield is preferably composed of a ferromagnetic alloy such as mu-metal, and is firmly retained within the cartridge case.

The features of the electromagnetic system of the transducer are shown in greater detail in FIG. 14. A magnetic shield comprised of the two cooperating halves 53 and 54 is frictionally seated within the interior of the case and forms an almost complete enclosure for the electromagnetic system. The forward electromagnetic core is comprised of a yoke 38, lateral poles 39 and 40 and pole pieces 41 and 42. The lateral poles 46 and 47, and pole pieces 48 and 49 of the rearwardly located electromagnet are also shown. The pole pieces form a socket having a square cross section into which the spade ferrule 30 is securely held by friction. Tightly held within the ferrule is the elastomeric bearing 31. The bearing has an inner socket of square cross section in which the stylus shank 27 and armature are contained, and in which they may be firmly cemented. The fact that the socket within the bearing has a square cross section facilitates orientation, and allows the stylus shank and armature to be accurately oriented and to be maintained in that position over great lengths of time. The bearing also provides vibrational damping and position restoring force for the stylus shank-armature assembly.

FIG. 23 is a view in perspective, partially exploded, showing the orientation of the core and pole pieces of the structure shown in FIGS. 13–16. As can be readily seen from FIG. 23, the poles 39 and 40 are directed toward the forward portion of the cartridge, while the poles 46 and 47 are directed rearwardly with respect to the cartridge. Since the structure of FIG. 23 is shown in partially exploded view, the pole pieces 41 and 42 are somewhat separated from the pole pieces 48 and 49. In the actual structure, however, the pole pieces 41, 42, 48 and 49 are interposed to form a common gap as described above. As FIG. 23 shows, the lateral poles 39 and 40, as well as the yoke 38, extend into the forward part of the cartridge, while the lateral poles 46 and 47, and the yoke 45, extend into the rearward portion.

FIG. 15 shows a similar cross sectional view taken at a plane rearwardly of that of FIG. 14. Here is shown the rearwardly mounted magnetic system comprised of the yoke 45, lateral poles 46 and 47 and pole pieces 48 and 49.

In assembling the pickup cartridge of the present invention, the lateral poles and their pole pieces are first assembled by casting the pole pieces into the plastic block 55 as shown in FIG. 16. This enables the precise orientation of the pole pieces to be established permanently with great precision, and also allows the core assembly to be easily handled during assembly of the cartridge. The plastic block 55 in which the four pole pieces are cast may be of any suitable resinous material which will set to a substantially rigid form. One material which has been found well suited for this purpose is an epoxy casting resin; however, other resins such as polystyrene or phenolic resins may be used. After the core assembly has been formed, the coils are slipped thereover and the yokes inserted to complete the cores. The two halves of the magnetic shield 53 and 54 are then assembled over the electromagnetic system. The combined unit is then inserted in the cartridge case, the terminal connection leads soldered to the coils, and the cover 23e cemented in place. If desired, a potting resin may be poured into the cavity surrounding the electromagnet in order to affix the electromagnet firmly to the cartridge case and to seal it off from the effects of moisture. The cover 23e is then cemented to the cartridge case as described above.

The stylus-armature assembly is assembled by inserting the elastomeric bearing 31 into the ferrule of the spade. The bearing 31, as shown in FIG. 17, is shaped to fit snugly in the spade ferrule 30. Within the bearing socket 56 having a square cross section is inserted the stylus shank and armature assembly. The ends 57 of the aperture in the bearing are enlarged into a funnel-like structure for easy insertion of the assembly, and to give greater freedom of movement to the vibrating armature.

FIGS. 18–22 illustrate an alternative construction of the stylus-armature assembly which offers some advantages over the embodiment described above and shown in the preceding figures. A complete cartridge is shown in FIG. 18, sufficiently cut away to illustrate the positioning of the stylus shank 58 and its supporting spade 59. The stylus tip 60 is supported by the stylus shank in the usual manner. This structure is shown in bottom view in FIG. 19. As can be seen, the structure of the spade does not terminate in wings, as in the case of the assembly shown in FIG. 12. However, the spade and stylus assembly may still be easily removed by grasping the tip of the spade and pulling the assembly outward. The stylus shank 58, the spade 59 and the stylus tip 60 are best shown in FIG. 20. At one end of the stylus shank there is affixed the magnet armature 61, the unit being retained within a socket provided in an elastomeric bearing 62. The elastomeric bearing 62 is firmly retained within the spade ferrule 59a. As shown in FIG. 22, the lower corner of the magnet armature has been removed by a suitable means such as grinding, and a wire spring 63 cemented to the magnet armature and stylus shank. The other end of the wire spring passes through a hole 64 in the spade 59 and is affixed to the spade by any suitable means such as soldering. The spring is composed of a length of a small diameter spring wire, preferably of a non-magnetic material such as Phosphor bronze or beryllium copper. The function of the spring is to provide a restoring force to the moving system and to support the moving system against the static needle force. Additionally, the spring provides a positive means of locating the moving system within the spade. It has been found that in the absence of the spring, when certain types of elastomers are used for the bearing 31 or 62, the material will take a permanent set when a force is applied thereto over an extended period of time. This results in the displacement of the armature from its normal position which causes distortion of the reproduced sound. When the spring 63 is provided and properly positioned, it will restore the stylus shank and magnet and armature assembly to its predetermined neutral position whenever the cartridge is lifted from a record.

The present transducer systems and pickup cartridges exhibit many advantages. They are extremely verstile and may be adapted to function with stereophonically recorded disks produced according to either of the two different systems now in use. The pickup cartridges are easily constructed, and will withstand hard use. They lend themselves to precision construction, and will reproduce stereophonically recorded sound with excellent fidelity and channel separation. The stylus assemblies may readily be replaced and are self orienting.

Invention is claimed as follows:

1. A phonograph pickup cartridge comprising a cartridge body and a transducer system operatively mounted therein, said transducer system comprising a pair of electromagnets, each electromagnet comprised of a core terminating in a pair of spaced-apart pole pieces forming a gap therebetween and a pair of series-connected coils arranged about said core, one of said cores being mounted forwardly and one of said cores being mounted rearwardly with respect to said gap between the pole pieces, the orientation of said pole pieces being such that they form a common gap and the gap direction lines of the respective pairs of pole pieces are perpendicular to each other, and an armature-stylus sub-assembly, said sub-assembly comprising a generally sheet-form supporting member having a ferrule at one end mounted within said common gap, a bearing of an elastomeric material having an axially positioned aperture forming a socket fixedly mounted within said ferrule, an armature comprising a permanent magnet operatively mounted in said socket for angular vibration within said common gap substantially about a point intermediate the poles of said magnet, the magnetic axis of said armature being oriented susbtantially perpendicular to both said gap direction lines, and a stylus affixed to said armature for transmitting vibration thereto, whereby said sub-assembly is removable by grasping said supporting member and retracting said sub-assembly axially.

2. An armature-stylus sub-assembly for a magnetic pickup cartridge comprised of two electromagnetic systems each terminating in a pair of spaced-apart pole pieces arranged to described a common magnetic gap and to form a socket having a recess substantially co-extensive with said gap, said sub-assembly comprising a supporting member, a bearing of an elastomeric material having a cannel therein retained within said supporting member, an armature comprising a permanent magnet operatively mounted in said bearing channel for angular vibration substantially about a point intermediate the poles of said magnet, means including a stylus connected with said armature for transmitting vibrations thereto, and spring means connecting said stylus with said supporting member for maintaining proper normal orientation between said stylus and said supporting member, the portion of said supporting member containing said armature and said bearing being contoured so that it may be inserted axially into the recess of said socket at said common gap and, when so inserted, orients and retains said armature within said gap in operating position.

3. A sub-assembly according to claim 2 wherein said spring means is an elastomeric body.

4. A sub-assembly according to claim 2 wherein said spring means is a wire spring one end of which is connected to said stylus and the other end of which is connected to said supporting member.

5. A phonograph pickup cartridge comprising a cartridge body and a transducer system operatively mounted therein, said transducer system comprising a pair of electromagnets each comprised of a core terminating in a pair of spaced-apart pole pieces forming a gap therebetween and a coil arranged about said core, the orientation of said pole pieces being such that they form a common gap with the gap directions of the respective pairs of pole pieces perpendicular to each other, said common gap forming an open ended socket, and a subassembly frictionally and removably held in the socket including a bearing of an elastomeric material having an axial aperture therein, an armature comprising a permanent magnet operatively supported in said aperture in said socket for angular vibration within said common gap substantially about a point equidistant from the two poles of said magnet, the magnetic axis of said armature being oriented substantially perpendicular to both said gap directions of said pairs of pole pieces, and means including a stylus connected with said armature for transmitting vibrations thereto, said cartridge including means for insuring orientation of the stylus with respect to the pole pieces for stereophonic vibration of the armature by the stylus.

6. An armature-stylus subassembly for a magnetic pickup cartridge comprised of two electromagnetic systems each terminating in a pair of spaced-apart pole pieces arranged to describe a common magnetic gap and to form a socket having a recess substantially co-extensive with said gap, said subassembly comprising a supporting member, a bearing of an elastomeric material having a channel therein retained within said supporting member, an armature comprising a permanent magnet operatively mounted in said bearing channel for angular vibration substantially about a point intermediate the poles of said magnet, means including a stylus connected with said armature for transmitting vibrations thereto, and spring means connecting said stylus with said supporting member for maintaining proper normal orientation between said stylus and said supporting member, said spring means comprising a wire spring having one end secured to said magnet and the other end secured to said support member forwardly of said magnet and at a point on said support member spaced from said magnet and from said stylus, the portion of said supporting member containing said armature and said bearing being contoured so that it may be inserted axially into the recess of said socket at said common gap and, when so inserted, orients and retains said armature within said gap in operative position.

References Cited in the file of this patent

UNITED STATES PATENTS

| | | |
|---|---|---|
| 2,373,181 | Fleming | Apr. 10, 1945 |
| 2,507,708 | Greener | May 16, 1950 |
| 2,578,809 | Ketchum | Dec. 18, 1951 |
| 2,771,515 | Kelly | Nov. 20, 1956 |
| 2,875,282 | Reiback | Feb. 24, 1959 |

FOREIGN PATENTS

| | | |
|---|---|---|
| 336,648 | Great Britain | Oct. 15, 1930 |
| 362,494 | Great Britain | Dec. 2, 1931 |

OTHER REFERENCES

N. Wittenberg: Philips Technical Review, vol. 18, Oct. 20, 1956, pp. 101–109.